(12) United States Patent
Loeshelle

(10) Patent No.: US 11,380,150 B2
(45) Date of Patent: Jul. 5, 2022

(54) USER DETECTION

(71) Applicant: Alarm.com Incorporated, Tysons, VA (US)

(72) Inventor: Joel Loeshelle, Tysons, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 17/158,534

(22) Filed: Jan. 26, 2021

(65) Prior Publication Data

US 2021/0241551 A1 Aug. 5, 2021

Related U.S. Application Data

(60) Provisional application No. 62/970,019, filed on Feb. 4, 2020.

(51) Int. Cl.
*G07C 9/00* (2020.01)
*G06N 5/00* (2006.01)
*G06N 20/00* (2019.01)

(52) U.S. Cl.
CPC ......... *G07C 9/00182* (2013.01); *G06N 5/003* (2013.01); *G06N 20/00* (2019.01)

(58) Field of Classification Search
CPC ...... G07C 9/00182; G07C 2009/00793; G07C 9/00309; G07C 2209/63; G06N 5/03; G06N 20/00; G06N 5/046; G06N 7/0046
See application file for complete search history.

(56) References Cited

U.S. PATENT DOCUMENTS

| | | | | |
|---|---|---|---|---|
| 10,395,452 | B2* | 8/2019 | Morrison | G07C 9/20 |
| 11,030,835 | B2* | 6/2021 | Martin | G01S 5/0257 |
| 11,055,941 | B1* | 7/2021 | Eber | G07C 9/29 |
| 2016/0241999 | A1* | 8/2016 | Chin | G07C 9/00182 |
| 2017/0301166 | A1* | 10/2017 | Earles | G07C 9/00563 |
| 2017/0330226 | A1* | 11/2017 | Kuenzi | H04W 12/08 |
| 2018/0162321 | A1* | 6/2018 | Spiess | G07C 9/29 |
| 2019/0132748 | A1* | 5/2019 | Guo | H04W 16/28 |
| 2020/0045537 | A1* | 2/2020 | Colombo | H04W 12/71 |
| 2020/0150262 | A1* | 5/2020 | Kim | H04B 1/7163 |
| 2020/0349785 | A1* | 11/2020 | Kuenzi | G07C 9/00571 |
| 2020/0351661 | A1* | 11/2020 | Kuenzi | H04L 67/20 |
| 2021/0197764 | A1* | 7/2021 | Siswick | G07C 9/00309 |
| 2021/0209882 | A1* | 7/2021 | Kuenzi | H04W 4/00 |
| 2021/0383624 | A1* | 12/2021 | Hoyer | G07C 9/00563 |

* cited by examiner

*Primary Examiner* — Ojiako K Nwugo
(74) *Attorney, Agent, or Firm* — Fish & Richardson P.C.

(57) ABSTRACT

Methods, systems, and apparatus, including computer programs encoded on computer-storage media, for user detection. In some implementations, a corresponding method includes obtaining an authorized user list including first identification information of an Ultra Wide Band (UWB) device; obtaining, from the UWB device, (i) location information of the UWB device at a property, (ii) directionality information of the UWB device, and (iii) second identification information of the UWB device; determining the first identification information of the UWB device matches the second identification information of the UWB device; determining the location information and the directionality information of the UWB device satisfy a predetermined authorization requirement for the property; and sending, to a control device of the property, an access signal that is configured to allow a user associated with the UWB device to access an area of the property.

20 Claims, 4 Drawing Sheets

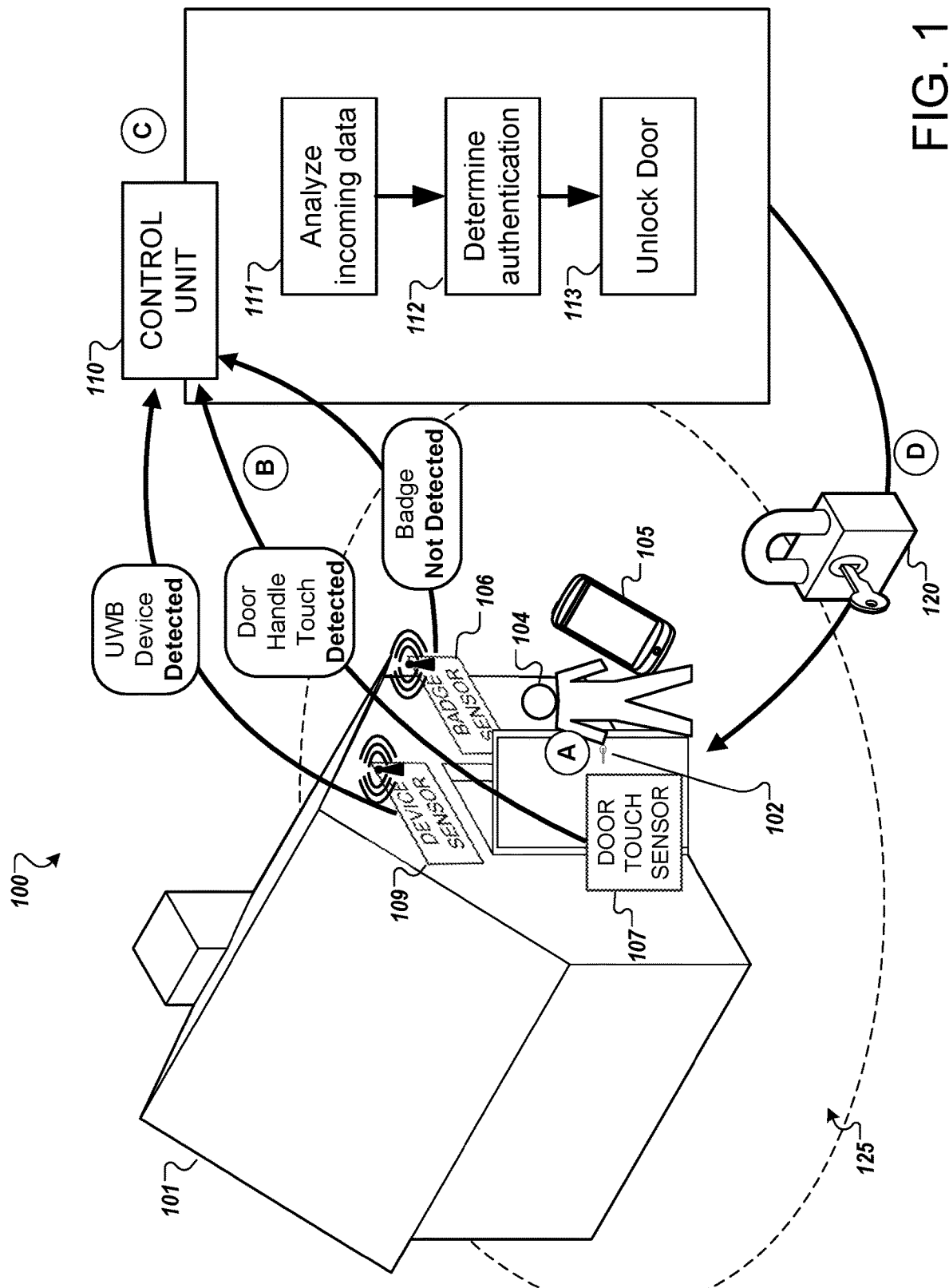

USER DETECTION

CROSS-REFERENCE TO RELATED APPLICATION

This application claims the benefit of U.S. Provisional Application No. 62/970,019, filed on Feb. 4, 2020, the contents of which are incorporated by reference herein in its entirety.

BACKGROUND

Many properties are equipped with monitoring systems that include sensors and connected system components.

SUMMARY

Techniques are described for monitoring system that uses devices that communicate with Ultra Wide Band (UWB) frequencies. UWB is a radio technology that uses low energy transmissions for short-range, high-bandwidth communication. Using one or more UWB enabled devices, UWB technology can be used to detect precise indoor location and direction as well as to authenticate a user in various situations.

Because of a relatively short broadcast time compared to other technologies (e.g., Wi-Fi, Bluetooth), UWB technology can often seamlessly invoke actions related to user detection. For example, users approaching a locked door can have the door unlocked as they begin turning the handle. This form of authentication can be used in many other scenarios where fast, efficient user authentication is required. UWB technology can also offer greater location and directionality accuracy than other technologies (e.g., Wi-Fi, Bluetooth) which can be used as part of the detection process. For example, activities involving financial transactions (e.g., ride sharing, bike sharing, restaurants) can use UWB as a form of authentication, confirming not only the identity of the user but, through precise location monitoring and directionality, the fact that the user is in the correct location to be eligible for the transaction, before accounts are paid. The addition of location and direction tracking can be used to prevent certain cases of user impersonation or fraud while maintaining ease of use.

UWB frequency transmissions are able to penetrate the walls of buildings and other materials in a way that visible light, the frequencies used by many other monitoring cameras, cannot. This property of the UWB frequency can be used in a variety of monitoring system applications. In some implementations, the ability to detect devices or users through walls can allow a single device to monitor entire floors or properties potentially decreasing owner expenditures on equipment and installation. In some implementations, UWB devices can work with existing sensors to cover blind spots and aid in a variety of user detection events. For example, authorized UWB devices can be used as a deactivation method to disable security camera footage of a user from being sent remotely to a centralized server. Another example could be to use precise location measurements and directionality of a device or user to detect health issues or specific health events like a fall, stroke, or seizure.

In some implementations, UWB enabled devices can work with other forms of data to improve user detection. For example, in the case of user authentication, other forms of identification may be presented together with an authorized UWB device. A given system may use one or more of these forms of identification for authentication purposes. Other sensor data (e.g., from visible cameras, microphones, etc.) can also help authentication. Sensor data can also be used in collaboration with other detection methods involving UWB devices. In the case of UWB penetrating walls to locate devices or users, other forms of sensors on the property or location can be used either before or after UWB.

In one aspect, the disclosure provides a method that includes obtaining, by one or more computers, an authorized user list including first identification information of an Ultra Wide Band (UWB) device; obtaining, by the one or more computers and from the UWB device, (i) location information of the UWB device at a property, (ii) directionality information of the UWB device, and (iii) second identification information of the UWB device; determining, by the one or more computers, the first identification information of the UWB device matches the second identification information of the UWB device; determining, by the one or more computers, the location information and the directionality information of the UWB device satisfy a predetermined authorization requirement for the property; and sending, by the one or more computers to a control device of the property, an access signal that is configured to allow a user associated with the UWB device to access an area of the property.

In some implementations, determining that the location information and the directionality information of the UWB device satisfy the predetermined authorization requirement for the property includes comparing the location information and the directionality information of the UWB device to preexisting data that includes preexisting location information and preexisting directionality information.

In some implementations, before determining the first identification information of the UWB device matches the second identification information of the UWB device, the method includes obtaining sensor data from a sensor of the property, where the sensor data depicts the user approaching a door; determining, based on the sensor data, the user is a distance from the door; determining, based on the distance, a probability that the user will attempt to open the door; determining that the probability is above a predetermined threshold; and obtaining (i) the location information of the UWB device at the property, (ii) the directionality information of the UWB device, and (iii) the second identification information of the UWB device based on determining that the probability is above the predetermined threshold.

In some implementations, determining the location information and the directionality information of the UWB device satisfy the predetermined authorization requirement for the property includes, generating an input set including the location information and the directionality information of the UWB device; providing the input set to a trained heuristic model; obtaining an output set corresponding to the trained heuristic model processing the input set; and determining, based on the output set, the location information and the directionality information of the UWB device satisfy the predetermined authorization requirement for the property.

In some implementations, the method includes training a heuristic model to generate the trained heuristic model and training the heuristic model includes obtaining input set data and label data corresponding to the user at the property; and providing the input set data and the label data corresponding to the user to the heuristic model. In some implementations, the input set data and the label data correspond to one or more instances of the user approaching a door.

In some implementations, the one or more computers send the access signal to the control device of the property in response to (i) determining the first identification information of the UWB device matches the second identification information of the UWB device and (ii) the location information and the directionality information of the UWB device satisfy the predetermined authorization requirement for the property.

In some implementations, the access signal is configured to unlock a door of the property and the location information of the UWB device and the directionality information of the UWB device correspond to a location and directionality of the UWB device when the user is less than a predetermined distance from the door of the property.

In some implementations, the access signal is configured to unlock a door of the property and the location information of the UWB device and the directionality information of the UWB device correspond to a location and directionality of the UWB device when the user makes physical contact with an element of the door. In some implementations, the element of the door is a touch sensor configured to detect the physical contact of the user.

In some implementations, obtaining the directionality information of the UWB device includes obtaining a vector indicating a distance between the UWB device and a door handle of a door.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 1 is a diagram showing an example of a system for user detection.

Like reference numbers and designations in the various drawings indicate like elements.

DETAILED DESCRIPTION

Figure 2A:
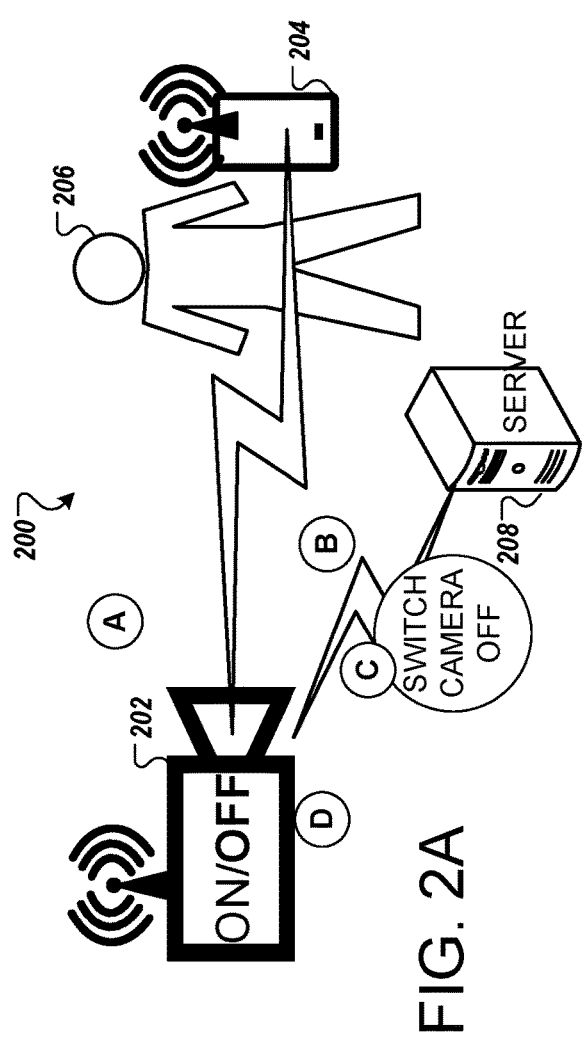
FIGS. 2A, 2B, and 2C show examples of systems for user detection.

FIG. 1 is a diagram showing an example of a system 100 for device detection. The system 100 includes a property 101 with door handle 102, a user 104, an UWB enabled device 105, a badge sensor 106, door touch sensor 107, a device sensor 109, and a control unit 110. Signals can pass within the system 100 using any form of wired or wireless networks.

In stage A, a user 104 is holding device 105 near a property 101. The user 104 is going to enter property 101 and touches a door handle 102. The door handle 102 is connected to a door touch sensor 107 that sends a door handle touch detected signal to control unit 110.

In some implementations, the device sensor 109 can be activated by the door touch sensor 107 or other device. A stimulus (e.g., person touching handle of locked door, employee requesting access to secure lab), once registered, can prompt the device sensor 109 to scan within sensory range 125 for an UWB device. The stimulus can also invoke other sensors (e.g., badge sensor).

In some implementations, other devices can be used to detect a user event (e.g., user opening door). For example, instead of a touch sensor, a camera near the door of property 101 could collect data used to detect when user 104 is near enough to the door that a likely entrance attempt could be attempted. Any stimulus from various sensors or surveillance techniques (e.g., pressure sensor, thermal imaging, microphones, etc.) within a system can be used as stimulus for the device sensor 109 to search for UWB devices.

Other implementations may include the ability to automatically detect users in other situations. For example, in a case where a user has a car, badge, phone, or other device with UWB technology, an automatic garage entry and exit system can be enabled to automatically allow cars to enter and exit. A user drives up to the garage whereupon the entry and exit system can look for and detect UWB paired devices in the vicinity. The system can receive signals from a device with UWB technology containing data which can be used to measure a distance or directionality between the device and the garage entrance. The distance or directionality can be compared with preexisting data to make a heuristic determination of whether or not the car is within range to activate an entrance procedure (e.g., lifting a gate). The device can also be used to determine whether or not the car is authorized or able to enter the garage. The speed of UWB detection can prevent cars from performing the type of stopping motion generally required in some conventional garage entry and exit systems (e.g., badge authentication in company garages, parking tickets in public garages, manual button press in private garages).

Stage B of FIG. 1 shows signals transmitted from the badge sensor 106, the door touch sensor 107, and the device sensor 109 to the control unit 110. The badge sensor 106 does not detect a badge near the door of property 101. Depending on implementation, the badge sensor 106 can send a badge not detected signal or maintain a nominal connection with the control unit 110. The nominal connection can be interpreted by the control unit 110 as no badges detected. A badge can be a security clearance card or other form of identification. The door touch sensor 107 detects a touch of user 104. The touch detection can be processed by the door touch sensor 107 or sent to the control unit 110 as a signal that the door handle 102 has been touched, in this case, by user 104. Touch sensors can be embedded within the door handle itself. The device sensor 109 detects an UWB enabled device 105. The detection signal can be sent to control unit 110 containing information about the device 105 as well as location and directionality of the device 105. Device 105 is detected within sensory range 125 of the device sensor 109 through the transmission of UWB signals. The precise location and directionality of the device 105 can be maintained with additional signals sent from device sensor 109 to control unit 110.

In some implementations, the location and directionality of an UWB device can be sufficient to trigger a detection event (e.g., the unlocking of door handle 102). For example, an UWB device worn around the neck could be situated in a similar position for multiple users. The standardization of position could be used by a device sensor to determine when to activate a certain subsystem. For example, a system could unlock a door when the user is between 2 and 3 feet away and pointed towards the door. Parameters could be added or tuned depending on implementation.

In some implementations, the UWB device can be detected before a situation which calls for authentication is registered by the control unit. In other implementations, the UWB device can be detected after. For example, as soon as UWB device 105 is in sensory range 125, device sensor 109 can register the detection with the control unit. This information can be stored and used later. In either case, the precise location of device 105 when user 104 touches door handle 102 can be saved and used within an action determination (e.g., unlocking a door).

In some implementations, both a badge and an UWB device can be used together. For example, a badge may be used for primary authentication while an UWB device can be used for a secondary authentication. The UWB device can be associated with a particular user. The system 100 can store user and UWB device matches for future recognition.

In systems where two or more forms of authentication exist, the primary authentication can change depending on system settings. For example, badge identification or other form of identification could be favored by an owner of a system. The system 100 could allow users to choose which method they prefer to primarily authenticate. For example, the user 104 may have an UWB enabled badge. The UWB enabled badge can be used instead of the UWB enabled device if the settings of system 100 allow primary authentication by UWB enabled badge. Additional layers of authentication, in general, can be enabled or disabled in the system 100.

In some implementations, other sensors around property 101 can be used to detect users. These sensors can exist in addition to UWB devices. For example, video cameras using a facial recognition algorithm could send data to a visual processor. The processor could match the face of a user attempting to enter a location to a valid ID card being swiped at a terminal. The ID match could be used together with an UWB device detection to grant the user access to a location.

In some implementations, other data can be sent along with primary signals from various property sensors. For example, in addition to a Boolean flag indicating that an UWB device has been detected, a vector of the distance between the detected UWB device 105 and the door handle 102 can be included in a data stream sent from device sensor 109 to control unit 110. This additional data can be used by control unit 110.

Stage C of FIG. 1 shows processes involved within control unit 110. The incoming data including no badge detected from badge sensor 106, door handle touch detected from door touch sensor 107, and UWB device detected from device sensor 109, is analyzed within algorithms matching incoming data to a given situation. In this instance, the situation involves the user 104 with UWB device 105 attempting to enter the property 101. Control unit 110 matches this data with a likely authentication event. Item 112, determine authentication, involves comparing the data collected with the necessary data for authentication. In this case, no badge or other form of ID is required for access to the property 101. The control unit 110 compares the data from device sensor 109 to requirements. Requirements can include checking the distance at which the UWB device 105 is from the door handle 102 as well as whether or not the UWB device 105 is on an authorized user list. Directionality or location of the UWB device 105 can also be used to check requirements. Additional data can be transferred from the original device sensor 109 device detection data signal or from subsequent exchanges. If authentication is approved, the control unit can perform a relevant action. In this case, the door of property 101 is unlocked. Item 113 contains the relevant action.

Stage D of FIG. 1 shows the unlock instruction 120 being sent from control unit 110 to property 101 releasing door handle 102. User 104 is able to open the door to property 101 having been authenticated by the system 100 which recognized the UWB device 105, its location relative to the door handle at the time of touch sensing, and its unique device ID to be sufficient to meet authentication requirements set for property 101.

In some implementations, the control unit 110 can use other systems to connect with the property 101 and door handle 102. For example, a control relay could be used to process signals from the control unit to controlled devices and systems within property 101.

FIG. 2A shows a system 200 for user detection including a camera 202, a mobile computing device 204, a user 206, and a server 208. The camera 202 and the mobile computing device 204 may each be equipped with UWB sensing technology or connected to a device capable of UWB communication.

In stage A, the camera 202 detects mobile computing device 204. In some implementations, the system 200 including camera 202, can detect motion within a room and respond by preparing to record images or video (e.g., lighting settings, camera functions enabled). In some implementations, before video or image recording, the camera 202 can look for any paired UWB devices in a given area. If there is a paired device in the given area, this can prevent a recording from taking place. If no paired device is detected in the given area, the recording can be created and uploaded to the server.

In stage B, the camera 202 communicates with the server 208. In some implementations, the communication may contain unique details of the mobile device 204 detected. The server 208 can recognize if mobile device 204 is associated with any authorized users. Based on any associations, the server 208 can perform relevant actions. In some cases, the system 200 can use the detection of authorized devices to halt uploads to the server or turn off security cameras completely. In this example, detection of mobile computing device 204 is associated with a shutdown of the camera 202.

In stage C, the server 208 sends the switch camera off signal to the camera 202.

In stage D, the camera 202, based on the signal sent from the server 208, switches from ON mode to OFF mode.

In some implementations, the server 208 can send a signal to halt uploads to the server instead of turning off the camera entirely. Other methods can be used separately or in combination including using shades or other privacy features in response to user or device detection. For example, a physical shade deployed over the lens of a camera can be used instead of electronic shutdowns. This has the advantage of visually showing users that video monitoring has stopped.

In some implementations, the mobile computing device 204 may communicate directly with the camera 202. For example, mobile device 204 can send data to camera 202 which may include passcodes and signals. The camera 202 can then use this data to determine authenticity and carryout appropriate actions (e.g., shutdown, activate privacy shades, rotate or adjust the direction of the camera 202). An action can be manually selected or engaged automatically depending on implementation.

Figure 2B:
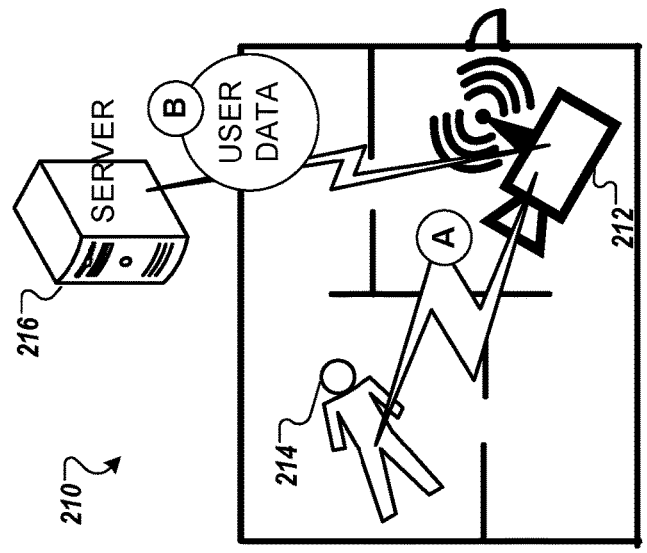

FIG. 2B shows a system 210 for user detection including a camera 212, a user 214, and a server 216. The camera 212 may be equipped with UWB sensing technology or connected to a device capable of UWB communication.

In stage A, the camera 212 detects user 214. The camera 212 detects an abrupt movement of user 214 causing the user 214 to go from a standing position to a prostrate position on the floor. Analysis of the data within system 210 concludes that user 214 has suffered a fall and needs assistance.

In some implementations, the camera 212 can use UWB technology to connect with an UWB enabled device of user 214 to detect user 214. In other implementations, the camera 212 can use UWB technology to directly detect a user 214. For example, by using frequency signals sent from an UWB device and measuring feedback from those signals, objects and users can be detected.

In some implementations, machine learning can be used to detect a change in activity patterns. For example, if a user usually goes between many rooms but has recently been moving within one room or fewer rooms than normal, this could indicate an injury or issue with the user. Similarly, if a user typically walks between floors of a location but has recently been confined to a single floor or subset of floors, it could indicate an injury or other issue. This data can be transferred to a server in the form of user data.

In stage B, user data of user 214 is sent to the server 216. The user data contains information about the fall suffered by user 214 as well as the location of user 214. The stored location of user 214 can be updated and accessed, depending on the settings of system 210, by relevant parties. For example, if paramedics arrive on the scene, the system 210 can provide the location of user 214 preventing time spent in searching. In some cases, the system 210 can use the user data to inform or instigate a call for police, ambulances, firetrucks, or other personnel.

UWB technology can be used in other emergency situations. Situations could include a fire, earthquake, or other emergency. For example, by analyzing UWB data the locations of users within a burning building could be logged and provided to relevant personnel. Users can be detected either directly or by a connection with an UWB enabled device.

Figure 2C:
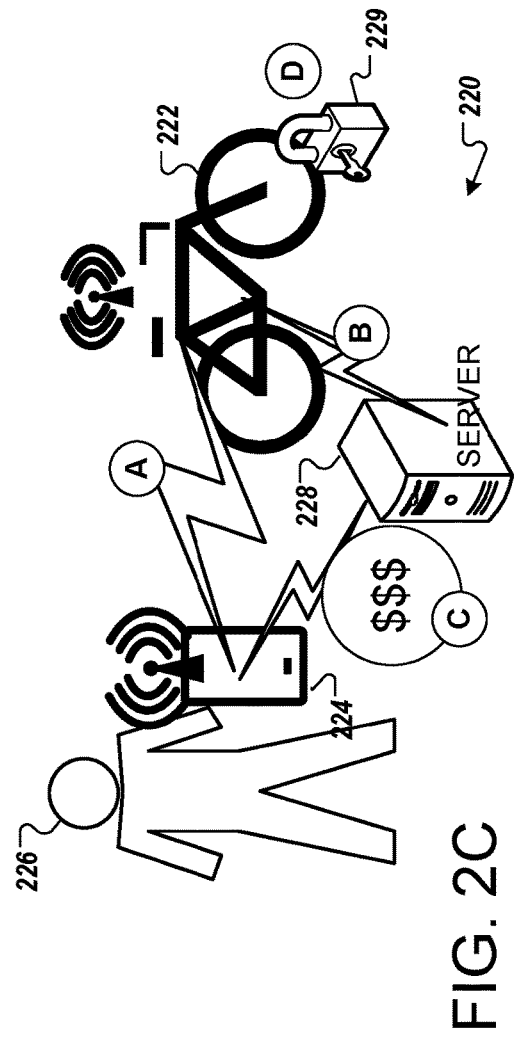

FIG. 2C shows a system 220 including a bike 222, a mobile device 224, a user 226, a server 228, and a bike lock 229. The bike 222 may be equipped with UWB sensing technology or connected to a device capable of UWB communication. The mobile device 224 may also be equipped with UWB sensing technology or connected to a device capable of UWB communication.

In stage A, the bike 222 detects mobile device 224. The detection can be made with UWB technology. In some implementations, the detection of the mobile device 224 can be a signal to begin transaction sequences where authorization and payment can take place to provide user 226 with a short term rental of bike 222. In other implementations, there can be a button or switch activated manually by the user within the vicinity of the bike 222. For example, a user can board the vehicle and press a button to 'check out'. Upon pressing the button, the location, directionality, or identity of UWB devices can be used to aid transactions.

In stage B, the bike 222 communicates with the server 228. Depending on implementation, the communication can include details of a detected device. For example, device identifiers (e.g., IMEI numbers, serial numbers) as well as positional data gleaned from UWB communication. In the case of FIG. 2C, positional location data can be useful in determining if a device is in the correct location or pointed in the correct direction to rent the bike such that devices nearby but not in the correct location are not considered potential renters of the bike. In some implementations, directionality of the device can also impact detection. For example, the correct location for device 224 can be to the immediate right or left of bike 222 while the correct direction could be facing towards the bike 222. A user walking by with another UWB device may be detectable by the bike 222 but due to position or directionality readings not matching correct location or directionality criteria, the user may not be eligible for transactions. Algorithms within the server 228, the bike 222, or other system can determine whether detected devices meet particular criteria.

In stage C, the user 226 pays for the bike 222 using a communication channel between the mobile device 224 and the server 228. The data needed to establish a connection with mobile device 224 can be sent by the server 228 or by the bike 222 depending on implementation.

In some implementations, the transaction can take place directly with the bike 222. For example, the bike 222 can have computational abilities able to receive and authenticate payment sources. Payment issued from user 226 and sent from mobile device 224 can be confirmed directly by the computational elements (e.g., computer processor, microprocessor) of the bike 222.

In stage D, the bike lock 229 is unlocked. The bike lock 229 can be unlocked either directly by the server 228 or by the bike 222. The bike 222 can use signals from the server 228 in determining whether to unlock the bike lock 229.

In some implementations, any of the actions including user detection, payment, or concluding result (e.g., unlocking a bike lock) can depend on UWB positional signals from mobile device 224. For example, after payment has been authorized, the bike lock 229 may open only if the mobile device 224 is within a few inches of the bike 222. Position requirements can help ensure a user is properly engaged with the device (e.g., holding handle bars, seated on bike seat) before unlocking. This feature has the advantage of helping to prevent any third party from removing the bike after payment has been received.

Figure 3:
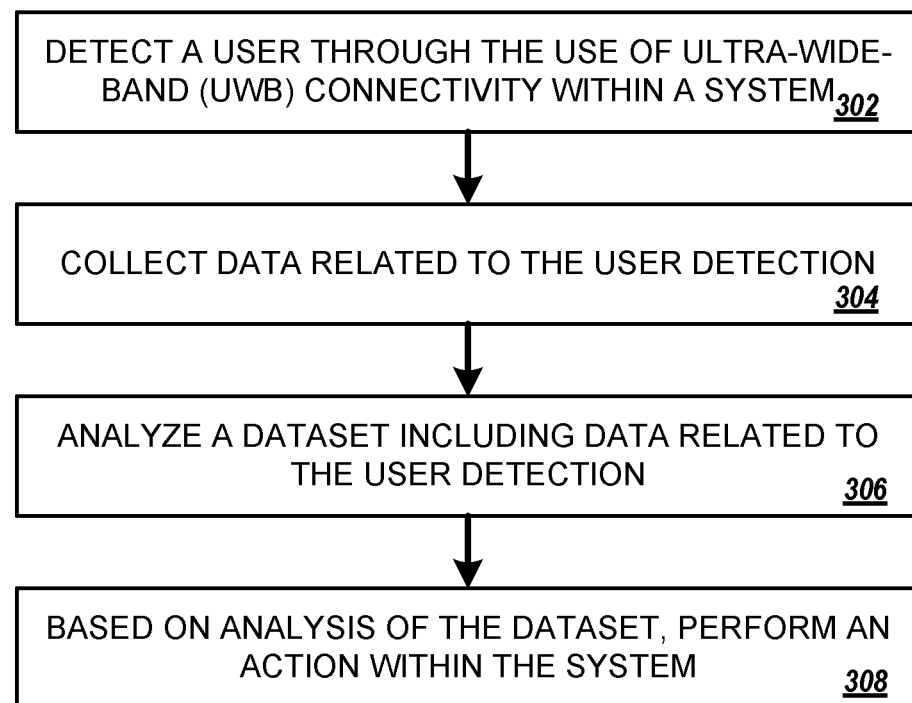
FIG. 3 is a flow diagram illustrating an example of a process for user detection.

FIG. 3 is a flowchart illustrating an example of a process 300 for user detection. The process 300 may be performed by one or more electronic systems, for example, the system 100 of FIG. 1.

The process 300 includes detecting a user through the use of ultra-wide-band (UWB) connectivity within a system (302). For example, the device sensor 109 and badge sensor 106 can be used to detect either UWB enabled devices or UWB enabled badges within the vicinity 125 of property 101.

In some implementations, before detecting the user through the use of UWB connectivity within the system, the process includes obtaining an authorized user list including identification information of an UWB device. For example, a control unit such as the control unit 110 can obtain an authorized user list that includes identification information of the UWB device 105. The identification information can include a unique numerical value such as an international mobile equipment identity (IMEI), electronic serial number (ESN), mobile equipment identifier (MEID), among others that is associated with the UWB device 105. In some implementations, the identification information includes alphanumeric data including user identification data. For example, the identification information can include a name of the user of the UWB device 105, an address of residence of the user UWB device 105, or other information related to the user of the UWB device 105 or the UWB device 105.

In some implementations, the authorized user list obtained by the control unit 110 includes one or more entries corresponding to one or more users. Each entry can include information indicating either an authorized user, an unauthorized user, or information that is not assigned to either an authorized or an unauthorized user. For an authorized user, an entry can include a list of corresponding identification information including identification information of one or more UWB devices corresponding to the authorized user. The entry can also include a flag indicating that each item of the entry is associated with the authorized user. For an unauthorized user, an entry can include a list of corresponding information including identification information of one or more UWB devices corresponding to the unauthorized user. The entry can also include a flag indicating that each item of the entry is associated with the unauthorized user.

In some implementations, information that is not assigned to either an authorized or an unauthorized user includes any information that is captured by a device, such as the control unit 110 that is not explicitly associated with any known user. For example, this information without a user can be stored on the system such that, if a user is later recognized, the control unit 110 can connect the pre-stored data to the corresponding user. In some cases, the number of times a given device is in a vicinity of a property can be used as an authorization item checked by a system such as the control unit 110. For example, devices that have been in the vicinity of a property more than a predetermined number of times can be tagged based on one or more data packets sent by the devices to a sensor of the property. In some cases, settings of a property can allow users with UWB devices that have been tagged in such a way to access certain areas of the property without explicitly being authorized or to lower any additional security measures given that the user is likely a known user.

In some implementations, the control unit 110 iteratively compares entries of the authorization list to obtained identification information of a given UWB device to determine if the UWB device corresponds to an authorized user. If the control unit 110 determines that data of at least one entry in the authorized user list is consistent with the given identification information of the given UWB device, the control unit 110 can determine that the given UWB device corresponds to the security level of the correspond user. For example, if the given identification information of the given UWB device is consistent with an entry corresponding to an authorized user, the UWB device can be used to determine a corresponding user is the authorized user. If the given identification information is consistent with an entry corresponding to an unauthorized user or is simply not consistent with any entry corresponding to an authorized user, the UWB device can be used to determine a corresponding user is the given unauthorized user or is simply unauthorized.

The process 300 includes collecting data related to the user detection (304). For example, device sensor 109 can send data related to user 104 and corresponding device 105 to a control unit 110. In addition to a Boolean flag representing a positive identification of UWB device 105, a location of the UWB device 105 can also be captured. A position vector can be used to capture relative distance between UWB device 105 and other systems.

In some implementations, the control unit 110 can obtain additional data from an UWB device. For example, the control unit 110 can obtain location information of the UWB device 105. The location information can be one or more numerical values such as a global positioning coordinate based on a global positioning system. The control unit 110 can obtain directionality information of the UWB device 105. For example, the directionality information can be a vector indicating a distance as well as direction from the UWB device 105 to another element of interest. In situations where the control unit 110 is looking to authorize access for a user to open a door, the directionality information can include a vector indicating a distance between the UWB device 105 and the door or element of the door such as the door handle 102. In other situations, other directionality information can be obtained based on a current orientation and location of the UWB device 105. The control unit 110 can further obtain identification information of the UWB device 105. For example, the identification information can be an IMEI or another unique identifier of the UWB device 105.

In some implementations, the location and directionality information of an UWB device is obtained in response to a user of the UWB device performing an action on a property. For example, the location and directionality information of the UWB device 105 can be obtained in response to the user 104 being within a certain distance from the door handle 102 or engaging with the door handle 102. If the user 104 is not within the certain distance from the door handle, the location and directionality information of the UWB device 105 is not obtained by the control unit 110. The control unit 110 or another connected component can determine the distance between the user 104 corresponding to the UWB device 105 and the door handle 102. The control unit 110 can then send a signal to the UWB device 105 to send a signal to the control unit 110 or connected component only when the user 104 is sufficiently close to the door handle 102 in order to prevent superfluous sending and processing of data.

The process 300 includes analyzing a dataset including data related to the user detection (306). For example, data sent from the device sensor 109 can be compared with existing paired UWB device data to discover if the UWB device 105 is a paired device.

In some implementations, analyzing the data set including data related to the user detection includes determining the identification information of an UWB device in an authorized user list matches the identification information obtained from the UWB device. For example, the control unit 110 can obtain identification information of the UWB device 105 and check whether or not the UWB device 104 is on an authorized user list. The authorized user list can be a set of data entries corresponding to one or more authorized users and one or more devices, including UWB devices, of the one or more authorized users. If the identification information of the UWB device 105 is included within an entry of the authorized user list corresponding to an authorized user, the UWB device 105 can be used to authorize a corresponding user operating the UWB device 105 such as the user 104.

In some implementations, analyzing the data set including data related to the user detection includes determining obtained location information and directionality information of an UWB device satisfy a predetermined authorization requirement for a given property. For example, previously obtained location information and directionality information of the UWB device, or another UWB device, can be compared to the obtained location information and directionality information of an UWB device to determine if the obtained location information and directionality information of the UWB device satisfy the predetermined authorization requirement.

In some implementations, before determining obtained location information and directionality information of an UWB device satisfy a predetermined authorization requirement for a given property, the control unit 110 obtains additional data. For example, the control unit 110 can obtain sensor data from a sensor of the property and determine, based on the sensor data that a user is approaching a door of the property. The distance between the user and the door of the property can be obtained based on analysis of the sensor data (e.g., camera data, weight sensing data, temperature data, among others). If the user is within a given vicinity of the door, the control unit can determine that the user is likely going to attempt to open the door of the property. If the door of the property is a locked door with some sort of security, the control unit 110, or another connected component, can determine that data should start to be collected from the UWB device 105 for authorization purposes. In some implementations, no data is sent or no data is processed before the control unit 110 obtains and processes the sensor data to determine that the user is likely going to attempt to open the door of the property thereby reducing unnecessary processing of identification information, location information, directionality information, or the like that is obtained from the UWB device 105.

In some implementations, a threshold is used to determine a distance within which a user is likely going to perform an action. For example, an action can be attempting to open a locked door. The user 104 can walk up to the door handle 102 and the control unit 110 can obtain sensor data from a camera or other sensor of the property 101. Based on the sensor data and a known location of the door handle 102, the control unit 110 can determine the distance between the door handle 102 and the user 104. If the distance between the door handle 102 and the user 104 is below a threshold, the control unit 110 can determine that the user is likely going to perform the action of attempting to open a locked door and thus additional authorization information should be exchanged with one or more devices of the user 104 to determine if the control unit 104 should unlock the door corresponding to the door handle 102.

Although the situation of opening a door is discussed, it is contemplated that other actions can be processed in a similar way. For example, payment authentication, such as payment authentication of a mobility device such as a scooter or bike, can be authorized using an UWB device and additional sensor data to determine when to begin an exchange of information between the UWB device and a given control unit for the given scenario.

In some implementations, signals from the UWB device are used to determine a relative location of the user. Based on a known distance and direction between the UWB sensing device and another element, such as the door handle or mobility device among others, and the distance and direction between the UWB device and the UWB sensing device, the distance between the UWB device and the other element can be determined by triangulation. In this way, the UWB device can at first send small data packets to reduce processing and data flow. Once the UWB device is in a predetermined location corresponding to a likely action, such as within a predetermined vicinity close to an element like a door handle or mobility device, a control unit can send a signal to the UWB device for larger data packets that include information necessary for authorization. The larger data packets can include more data than the small data packets previously sent and may be more computationally expensive to process or use more bandwidth to send or receive. In this way, data processing can be reduced by only obtaining and processing data in situations where authorization is likely to be used to perform a given action thereby reducing overall computational requirements, required bandwidth, and energy usage.

In some implementations, determining obtained location information and directionality information of an UWB device satisfy a predetermined authorization requirement for a given property include using a trained heuristic model. For example, a heuristic model can be trained using a pre-obtained location information and directionality information of one or more UWB devices in a given situation. The heuristic model can be trained to detect one or more events, for example, a user in a position corresponding to performing an action of opening a door or a user wishing to rent a mobility device. The heuristic model can use pre-obtained data of UWB devices in positions and orientations relative to one or more elements in an area and, based on the pre-obtained data of UWB devices, determine what positions and orientations correspond to a user likely engaging in an action of some kind. The trained heuristic model can determine, based on the UWB device of a user being at a specific location and with a specific orientation, that the user satisfies a predetermined authorization requirement for the property. For example, if two people with UWB devices are near a door, the UWB device closer to the door will be used to determine whether or not the UWB device satisfies the authorization requirement. In some cases, data from both devices is obtained and as long as one of the two devices is authorized, the door authorization requirement of the property can be satisfied.

In some implementations, a heuristic model is trained for a specific user at a property. For example, instead of training a heuristic model on a number of different users, a heuristic model can be trained specifically with data from a specific user at a specific property performing a specific action. In some cases, the heuristic model is partially trained prior to installation within a system connected to elements of a property. The heuristic model can then be fully trained by learning specific characteristics of the specific user at the specific property performing a specific action. For example, a heuristic model can be trained to detect the user 104 at the property 101 opening a door by using the door handle 102. Input training data for the heuristic model can include location and directionality of a UWB device as well as property variables such as time of day and identification information of the UWB device or a user associated with the UWB device. In some cases, ensemble models including at least one model trained to detect a specific user at a specific property performing a specific action can be used to detect one or more actions of one or more users at one or more properties. By training a heuristic model using a user specific data, the speed and accuracy of the model can be improved.

The process 300 includes, based on the analysis of the dataset, performing an action within the system (308). For example, once the control unit 110 has determined that the UWB device 105 is a paired device and is in the correct location, a signal can be sent to unlock the door of property 101. User 104 is now free to open the door of property 101 using door handle 102.

In some implementations, the action within the system includes sending a signal to a device of a property and the signal is sent only after one or more authorization processes have been completed. Before sending the signal to unlock the door of the property 101, the control unit 110 can determine if the situation of the user 104 approaching the property 101 satisfies various security requirements. For example, the control unit 110 can determine that identification information obtained from the UWB device 105 is included within an authorized user list. The control unit 110 can further determine that the identification information obtained from the UWB device 105 corresponds to an authorized user within information of the authorized user list by comparing the identification information obtained from the UWB device 105 to one or more entries of the authorized user list. The control unit 110 can also determine that location information and directionality information of the UWB device 105 satisfy the predetermined authorization requirement for the property. For example, the control unit 110 can determine that the location and directionality information of the UWB device 105 is consistent with previously obtained instances of location and directionality information of the UWB device 105 or another UWB device in the same or similar situations such as within the proximity of the door handle 102.

In some implementations, the control unit 110 sends the signal to unlock the door of the property 101 if at least one authorization process is successfully completed. For example, if the control unit 110 successfully completes an authorization process of checking identification information obtained from the UWB device 105 with identification information of an authorized user list, the control unit 110 can send the signal to unlock the door of the property 101. For another example, if the control unit 110 successfully completes an authorization process of determining that location information and directionality information of the UWB device 105 satisfies the predetermined authorization requirement for the property, the control unit 110 can send the signal to unlock the door of the property 101.

In some implementations, the control unit 110 must successfully perform both checking the identification information obtained from the UWB device 105 with identification information of an authorized user list and determining that location information and directionality information of the UWB device 105 satisfies the predetermined authorization requirement for the property before sending the signal to unlock the door of the property 101. In some implementations, one or more other authorization processes are required. In general, settings specific to a property can be tuned based on the level of security desired at a given property or desired by a given owner or user of the property.

In some implementations, the control unit 110 sends the signal to unlock the door of the property 101 corresponding to a time when the user 104 performs an action within the vicinity of the property 101. For example, the user 104 can reach out and make physical contact with the door handle 102 and the control unit 110 can be configured to unlock the door corresponding to the door handle 102 when the user 104 makes physical contact with the door handle 102. By waiting until the user 104 is making physical contact with the door handle 102, the system 100 can prevent superfluous unlocking and locking. In some implementations, after the user 104 lets go of the door handle 102, for example because the user 104 walks into the property 101, the control unit 110 can detect the lack of physical contact by a signal sent from a touch sensor embedded within the door handle 102. In response to the signal sent from the touch sensor indicating the lack of physical contact, the control unit 110 can send a locking signal that is configured to lock the door of the property 101.

In some implementations, pressure sensors or other sensors used on the property 101 can determine a location of the user 104 and determine, based on the location, whether or not to lock the door of the property 101. For example, a pressure plate or other sensor of the property 101 can be activated a certain time after the door is unlocked by the control unit 110. The activation of a pressure plate within the property 101 can be used by the control unit 110 to determine that the user 104 is beyond the door and the door can now be locked. In addition, pressure plates or other sensors can be used to preemptively gather information used for authorization as the user 104 approaches the property 101. The location of the pressure plates or other sensors can be used to determine a location of the user 104 and thus a distance to a certain element of the property 101 such as the door handle 102.

Figure 4:
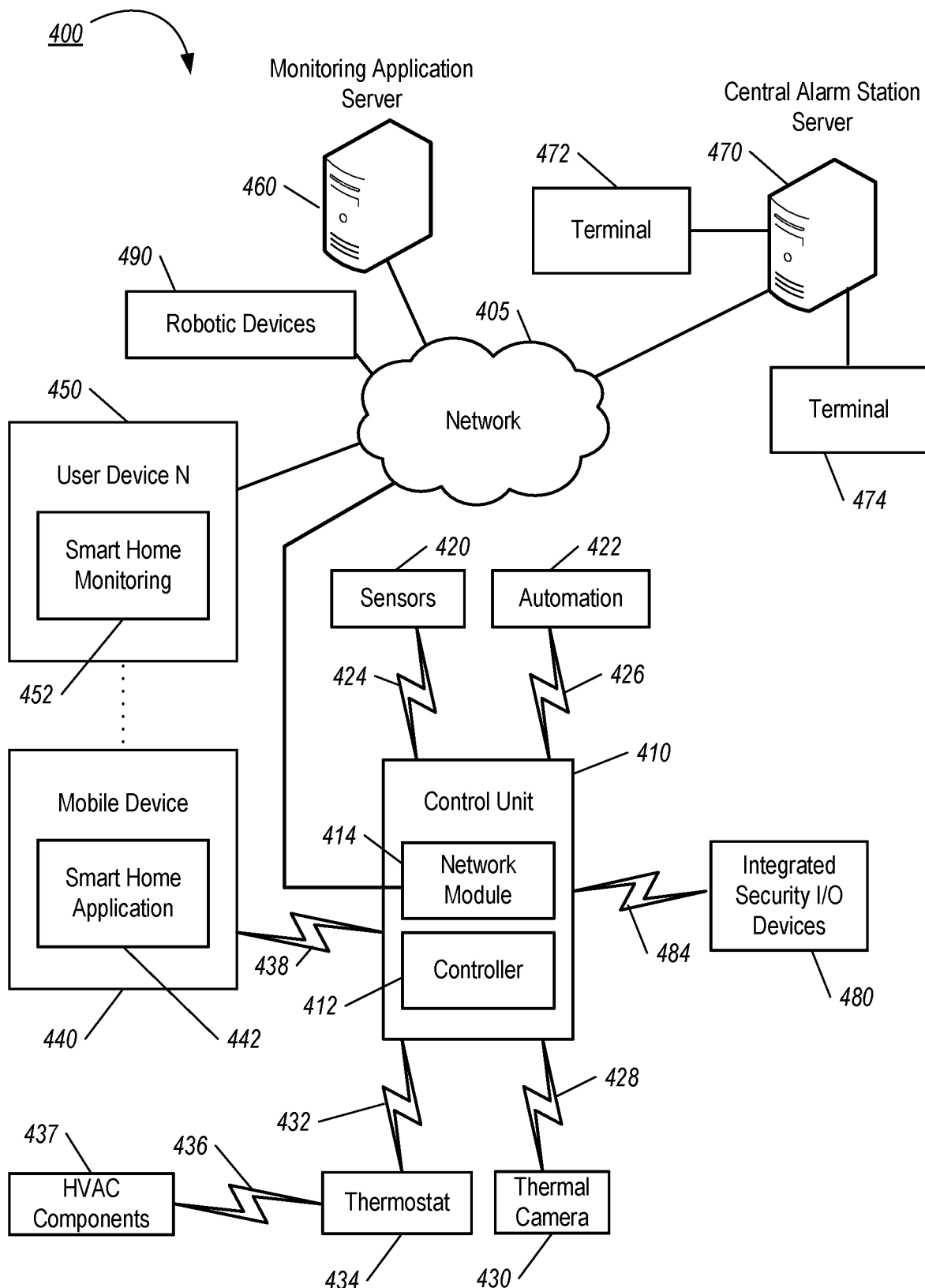
FIG. 4 is a diagram illustrating an example of a property monitoring system.

FIG. 4 is a diagram illustrating an example of a property monitoring system. The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors 420. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 420 can also include a radio-frequency identification (RFID) sensor that identifies a particular article that includes a pre-assigned RFID tag.

The system 400 also includes one or more thermal cameras 430 that communicate with the control unit 410. The thermal camera 430 may be an IR camera or other type of thermal sensing device configured to capture thermal images of a scene. For instance, the thermal camera 430 may be configured to capture thermal images of an area within a building or home monitored by the control unit 410. The thermal camera 430 may be configured to capture single, static thermal images of the area and also video thermal images of the area in which multiple thermal images of the area are captured at a relatively high frequency (e.g., thirty images per second). The thermal camera 430 may be controlled based on commands received from the control unit 410. In some implementations, the thermal camera 430 can be an IR camera that captures thermal images by sensing radiated power in one or more IR spectral bands, including NIR, SWIR, MWIR, and/or LWIR spectral bands.

The thermal camera 430 may be triggered by several different types of techniques. For instance, a Passive Infra-Red (PIR) motion sensor may be built into the thermal camera 430 and used to trigger the thermal camera 430 to capture one or more thermal images when motion is detected. The thermal camera 430 also may include a microwave motion sensor built into the camera and used to trigger the thermal camera 430 to capture one or more thermal images when motion is detected. The thermal camera 430 may have a "normally open" or "normally closed" digital input that can trigger capture of one or more thermal images when external sensors (e.g., the sensors 420, PIR, door/window, etc.) detect motion or other events. In some implementations, the thermal camera 430 receives a command to capture an image when external devices detect motion or another potential alarm event. The thermal camera 430 may receive the command from the controller 412 or directly from one of the sensors 420.

In some examples, the thermal camera 430 triggers integrated or external illuminators (e.g., Infra-Red or other lights controlled by the property automation controls 422, etc.) to improve image quality. An integrated or separate light sensor may be used to determine if illumination is desired and may result in increased image quality.

The thermal camera 430 may be programmed with any combination of time/day schedules, monitoring system status (e.g., "armed stay," "armed away," "unarmed"), or other variables to determine whether images should be captured or not when triggers occur. The thermal camera 430 may enter a low-power mode when not capturing images. In this case, the thermal camera 430 may wake periodically to check for inbound messages from the controller 412. The thermal camera 430 may be powered by internal, replaceable batteries if located remotely from the control unit 410. The thermal camera 430 may employ a small solar cell to recharge the battery when light is available. Alternatively, the thermal camera 430 may be powered by the controller's 412 power supply if the thermal camera 430 is co-located with the controller 412.

In some implementations, the thermal camera 430 communicates directly with the monitoring server 460 over the Internet. In these implementations, thermal image data captured by the thermal camera 430 does not pass through the control unit 410 and the thermal camera 430 receives commands related to operation from the monitoring server 460.

In some implementations, the system 400 includes one or more visible light cameras, which can operate similarly to the thermal camera 430, but detect light energy in the visible wavelength spectral bands. The one or more visible light cameras can perform various operations and functions within the property monitoring system 400. For example, the visible light cameras can capture images of one or more areas of the property, which the cameras, the control unit, and/or another computer system of the monitoring system 400 can process and analyze.

The system 400 also includes one or more property automation controls 422 that communicate with the control unit to perform monitoring. The property automation controls 422 are connected to one or more devices connected to the system 400 and enable automation of actions at the property. For instance, the property automation controls 422 may be connected to one or more lighting systems and may be configured to control operation of the one or more lighting systems. Also, the property automation controls 422 may be connected to one or more electronic locks at the property and may be configured to control operation of the one or more electronic locks (e.g., control Z-Wave locks using wireless communications in the Z-Wave protocol). Further, the property automation controls 422 may be connected to one or more appliances at the property and may be configured to control operation of the one or more appliances. The property automation controls 422 may include multiple modules that are each specific to the type of device being controlled in an automated manner. The property automation controls 422 may control the one or more devices based on commands received from the control unit 410. For instance, the property automation controls 422 may interrupt power delivery to a particular outlet of the property or induce movement of a smart window shade of the property.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at the property and/or environmental data at the home, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more property automation controls 422.

In some implementations, a module 437 is connected to one or more components of an HVAC system associated with the property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robot that are capable of moving and taking actions that assist in home monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan of a building on the property and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, one or more of the thermal cameras 430 may be mounted on one or more of the robotic devices 490.

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 can be associated with one or more charging stations. The charging stations may be located at predefined home base or reference locations at the property. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact-based charging stations and/or wireless charging stations. For contact-based charging stations, the robotic devices 490 may have readily accessible points of contact that the robotic devices 490 are capable of positioning and mating with a corresponding contact on the charging station. For instance, a helicopter type robotic device 490 may have an electronic contact on a portion of its landing gear that rests on and mates with an electronic pad of a charging station when the helicopter type robotic device 490 lands on the charging station. The electronic contact on the robotic device 490 may include a cover that opens to expose the electronic contact when the robotic device 490 is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device 490 may always use a first charging station and a second robotic device 490 may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device 490 to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the property automation controls 422, the thermal camera 430, the thermostat 434, and the integrated security devices 480 may communicate with the controller 412 over communication links 424, 426, 428, 432, and 484. The communication links 424, 426, 428, 432, and 484 may be a wired or wireless data pathway configured to transmit signals from the sensors 420, the property automation controls 422, the thermal camera 430, the thermostat 434, and the integrated security devices 480 to the controller 412. The sensors 420, the property automation controls 422, the thermal camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, and 484 may include a local network. The sensors 420, the property automation controls 422, the thermal camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 4 (CAT5) or Category 6 (CAT6) wired Ethernet network. The local network may be a mesh network constructed based on the devices connected to the mesh network.

The monitoring server 460 is one or more electronic devices configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor data, thermal image data, and other monitoring system data received from the monitoring system and perform analysis of the sensor data, thermal image data, and other monitoring system data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, thermal image, and other data to determine an activity pattern of a resident of the property monitored by the system 400. In some implementations, the monitoring server 460 may analyze the data for alarm conditions or may determine and perform actions at the property by issuing commands to one or more of the automation controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the thermal camera 430 and/or reports related to the monitoring system. Although FIG. 4 illustrates two user devices for brevity, actual implementations may include more (and, perhaps, many more) or fewer user devices.

The smart home application 442 and the smart home user interface 452 can allow a user to interface with the property monitoring system 400, for example, allowing the user to view monitoring system settings, adjust monitoring system parameters, customize monitoring system rules, and receive and view monitoring system messages.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors 420 and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system 400.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the property automation controls 422, the thermal camera 430, and the robotic devices 490. The one or more user devices 440 and 450 receive data directly from the sensors 420, the property automation controls 422, the thermal camera 430, and the robotic devices 490 (i.e., the monitoring system components) and sends data directly to the monitoring system components. The one or more user devices 440, 450 provide the appropriate interfaces/processing to provide visual surveillance and reporting.

In other implementations, the system 400 further includes network 405 and the sensors 420, the property automation controls 422, the thermal camera 430, the thermostat 434, and the robotic devices 49 are configured to communicate sensor and image data to the one or more user devices 440 and 450 over network 405 (e.g., the Internet, cellular network, etc.). In yet another implementation, the sensors 420, the property automation controls 422, the thermal camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the property automation controls 422, the thermal camera 430, the thermostat 434, and the robotic devices 490 to a pathway over network 405 when the one or more user devices 440 and 450 are farther from the sensors 420, the property automation controls 422, the thermal camera 430, the thermostat 434, and the robotic devices 490. In some examples, the system leverages GPS information from the one or more user devices 440 and 450 to determine whether the one or more user devices 440 and 450 are close enough to the monitoring system components to use the direct local pathway or whether the one or more user devices 440 and 450 are far enough from the monitoring system components that the pathway over network 405 is required. In other examples, the system leverages status communications (e.g., pinging) between the one or more user devices 440 and 450 and the sensors 420, the property automation controls 422, the thermal camera 430, the thermostat 434, and the robotic devices 490 to determine whether communication using the direct local pathway is possible. If communication using the direct local pathway is possible, the one or more user devices 440 and 450 communicate with the sensors 420, the property automation controls 422, the thermal camera 430, the thermostat 434, and the robotic devices 490 using the direct local pathway. If communication using the direct local pathway is not possible, the one or more user devices 440 and 450 communicate with the monitoring system components using the pathway over network 405.

In some implementations, the system 400 provides end users with access to thermal images captured by the thermal camera 430 to aid in decision making. The system 400 may transmit the thermal images captured by the thermal camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 430 or other cameras of the system 400). In these implementations, the thermal camera 430 may be set to capture thermal images on a periodic basis when the alarm system is armed in an "armed away" state, but set not to capture images when the alarm system is armed in an "armed stay" or "unarmed" state. In addition, the thermal camera 430 may be triggered to begin capturing thermal images when the alarm system detects an event, such as an alarm event, a door-opening event for a door that leads to an area within a field of view of the thermal camera 430, or motion in the area within the field of view of the thermal camera 430. In other implementations, the thermal camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method for property access control comprising:
   obtaining, by one or more computers, an authorized user list comprising first identification information of an Ultra Wide Band (UWB) device;
   obtaining, by the one or more computers and from the UWB device, (i) location information of the UWB device at a property, (ii) directionality information of the UWB device, and (iii) second identification information of the UWB device;
   determining, by the one or more computers, the first identification information of the UWB device matches the second identification information of the UWB device;
   determining, by the one or more computers, the location information and the directionality information of the UWB device satisfy a predetermined authorization requirement for the property; and
   sending, by the one or more computers to a control device of the property, an access signal that is configured to allow a user associated with the UWB device to access an area of the property.

2. The method of claim 1, wherein determining the location information and the directionality information of the UWB device satisfy the predetermined authorization requirement for the property comprises:
   comparing the location information and the directionality information of the UWB device to preexisting data comprising preexisting location information and preexisting directionality information.

3. The method of claim 1, wherein before determining the first identification information of the UWB device matches the second identification information of the UWB device, the method further comprises:
   obtaining sensor data from a sensor of the property, wherein the sensor data depicts the user approaching a door;
   determining, based on the sensor data, the user is a distance from the door;
   determining, based on the distance, a probability that the user will attempt to open the door;
   determining that the probability is above a predetermined threshold; and
   obtaining (i) the location information of the UWB device at the property, (ii) the directionality information of the UWB device, and (iii) the second identification information of the UWB device based on determining that the probability is above the predetermined threshold.

4. The method of claim 1, wherein determining the location information and the directionality information of the UWB device satisfy the predetermined authorization requirement for the property comprises:
   generating an input set comprising the location information and the directionality information of the UWB device;
   providing the input set to a trained heuristic model;
   obtaining an output set corresponding to the trained heuristic model processing the input set; and
   determining, based on the output set, the location information and the directionality information of the UWB device satisfy the predetermined authorization requirement for the property.

5. The method of claim 4, further comprising training a heuristic model to generate the trained heuristic model, wherein training the heuristic model comprises:
   obtaining input set data and label data corresponding to the user at the property; and
   providing the input set data and the label data corresponding to the user to the heuristic model.

6. The method of claim 5, wherein the input set data and the label data correspond to one or more instances of the user approaching a door.

7. The method of claim 1, wherein the one or more computers send the access signal to the control device of the property in response to (i) determining the first identification information of the UWB device matches the second identification information of the UWB device and (ii) the location information and the directionality information of the UWB device satisfy the predetermined authorization requirement for the property.

8. The method of claim 1, wherein the access signal is configured to unlock a door of the property and the location information of the UWB device and the directionality information of the UWB device correspond to a location and directionality of the UWB device when the user is less than a predetermined distance from the door of the property.

9. The method of claim 1, wherein the access signal is configured to unlock a door of the property and the location information of the UWB device and the directionality information of the UWB device correspond to a location and directionality of the UWB device when the user makes physical contact with an element of the door.

10. The method of claim 9, wherein the element of the door is a touch sensor configured to detect the physical contact of the user.

11. The method of claim 1, wherein obtaining the directionality information of the UWB device comprises:
obtaining a vector indicating a distance between the UWB device and a door handle of a door.

12. A system comprising one or more computers and one or more storage devices on which are stored instructions that are operable, when executed by the one or more computers, to cause the one or more computers to perform operations comprising:
obtaining an authorized user list comprising first identification information of an Ultra Wide Band (UWB) device;
obtaining, from the UWB device, (i) location information of the UWB device at a property, (ii) directionality information of the UWB device, and (iii) second identification information of the UWB device;
determining the first identification information of the UWB device matches the second identification information of the UWB device;
determining the location information and the directionality information of the UWB device satisfy a predetermined authorization requirement for the property; and
sending, to a control device of the property, an access signal that is configured to allow a user associated with the UWB device to access an area of the property.

13. The system of claim 12, wherein determining the location information and the directionality information of the UWB device satisfy the predetermined authorization requirement for the property comprises:
comparing the location information and the directionality information of the UWB device to preexisting data comprising preexisting location information and preexisting directionality information.

14. The system of claim 12, wherein before determining the first identification information of the UWB device matches the second identification information of the UWB device, the operations further comprise:
obtaining sensor data from a sensor of the property, wherein the sensor data depicts the user approaching a door;
determining, based on the sensor data, the user is a distance from the door;
determining, based on the distance, a probability that the user will attempt to open the door;
determining that the probability is above a predetermined threshold; and
obtaining (i) the location information of the UWB device at the property, (ii) the directionality information of the UWB device, and (iii) the second identification information of the UWB device based on determining that the probability is above the predetermined threshold.

15. The system of claim 12, wherein determining the location information and the directionality information of the UWB device satisfy the predetermined authorization requirement for the property comprises:
generating an input set comprising the location information and the directionality information of the UWB device;
providing the input set to a trained heuristic model;
obtaining an output set corresponding to the trained heuristic model processing the input set; and
determining, based on the output set, the location information and the directionality information of the UWB device satisfy the predetermined authorization requirement for the property.

16. The system of claim 15, further comprising training a heuristic model to generate the trained heuristic model, wherein training the heuristic model comprises:
obtaining input set data and label data corresponding to the user at the property; and
providing the input set data and the label data corresponding to the user to the heuristic model.

17. The system of claim 16, wherein the input set data and the label data correspond to one or more instances of the user approaching a door.

18. The system of claim 12, wherein the one or more computers send the access signal to the control device of the property in response to (i) determining the first identification information of the UWB device matches the second identification information of the UWB device and (ii) the location information and the directionality information of the UWB device satisfy the predetermined authorization requirement for the property.

19. The system of claim 12, wherein the access signal is configured to unlock a door of the property and the location information of the UWB device and the directionality information of the UWB device correspond to a location and directionality of the UWB device when the user is less than a predetermined distance from the door of the property.

20. A non-transitory computer storage medium encoded with instructions that, when executed by one or more computers, cause the one or more computers to perform operations comprising:
obtaining an authorized user list comprising first identification information of an Ultra Wide Band (UWB) device;
obtaining, from the UWB device, (i) location information of the UWB device at a property, (ii) directionality information of the UWB device, and (iii) second identification information of the UWB device;
determining the first identification information of the UWB device matches the second identification information of the UWB device;
determining the location information and the directionality information of the UWB device satisfy a predetermined authorization requirement for the property; and
sending, to a control device of the property, an access signal that is configured to allow a user associated with the UWB device to access an area of the property.

* * * * *